(12) United States Patent
Schmidt

(10) Patent No.: US 11,657,559 B2
(45) Date of Patent: May 23, 2023

(54) COMMUNICATION SYSTEM AND METHOD FOR PROVIDING A VIRTUAL MEETING SPACE

(71) Applicant: Apple Inc., Cupertino, CA (US)

(72) Inventor: Eberhard Schmidt, Kleinmachnow (DE)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/529,561

(22) Filed: Nov. 18, 2021

(65) Prior Publication Data

US 2022/0076478 A1    Mar. 10, 2022

Related U.S. Application Data

(63) Continuation of application No. 16/737,803, filed on Jan. 8, 2020, now Pat. No. 11,189,072, which is a
(Continued)

(30) Foreign Application Priority Data

Aug. 7, 2015    (EP) .................................... 15180273

(51) Int. Cl.
*G06T 13/80*    (2011.01)
*G06F 3/01*    (2006.01)
(Continued)

(52) U.S. Cl.
CPC .............. *G06T 13/80* (2013.01); *G06F 3/011* (2013.01); *G06F 3/015* (2013.01); *G06Q 10/10* (2013.01); *H04N 7/157* (2013.01); *G06V 40/176* (2022.01)

(58) Field of Classification Search
None
See application file for complete search history.

(56) References Cited

U.S. PATENT DOCUMENTS 6,466,232 B1    10/2002    Newell et al.
7,418,116 B2    8/2008    Fedorovskaya et al.
(Continued)

FOREIGN PATENT DOCUMENTS

WO    2013152454 A1    10/2013

OTHER PUBLICATIONS

International Search Report for PCT/EP2016/068817 dated Nov. 2, 2016.

*Primary Examiner* — Edward Martello
(74) *Attorney, Agent, or Firm* — Fernando & Partners, LLP

(57) ABSTRACT

The invention relates to a communication system and a method for providing a virtual meeting of a first user (U1, U2, U3, U4) and a second user (U1, U2, U3, U4), comprising a first communication device (12, 14, 16, 18, 24, 26, 28, 32, 34) with a first display device (12a, 14a, 16a, 18a, 24a, 26a, 28a, 32a) associated with the first user (U1, U2, U3, U4), and a second communication device (12, 14, 16, 18, 24, 26, 28, 32, 34) with a second display device (12a, 14a, 16a, 18a, 24a, 26a, 28a, 32a) associated with the second user (U1, U2, U3, U4). Moreover a virtual meeting space (22) is displayed on the second display device (12a, 14a, 16a, 18a, 24a, 26a, 28a, 32a), user related data (B1, B2, B3, D1, D2, D3) related to the first user (U1, U2, U3, U4) are provided and a first displaying characteristic (B1', B2', B3') of a first object (U1', U2', U3', U4', 30) is determined in dependency of the provided user related data (B1, B2, B3, D1, D2, D3) according to a set degree of variance (R1, R2, R3) of the user related data (B1, B2, B3, D1, D2, D3). Further the first object (U1', U2', U3', U4', 30) is displayed with the determined first displaying characteristic (B1', B2', B3') according to the set degree of variance (R1, R2, R3) within the virtual meeting space (22) displayed on the second display (Continued)

Figure 2:
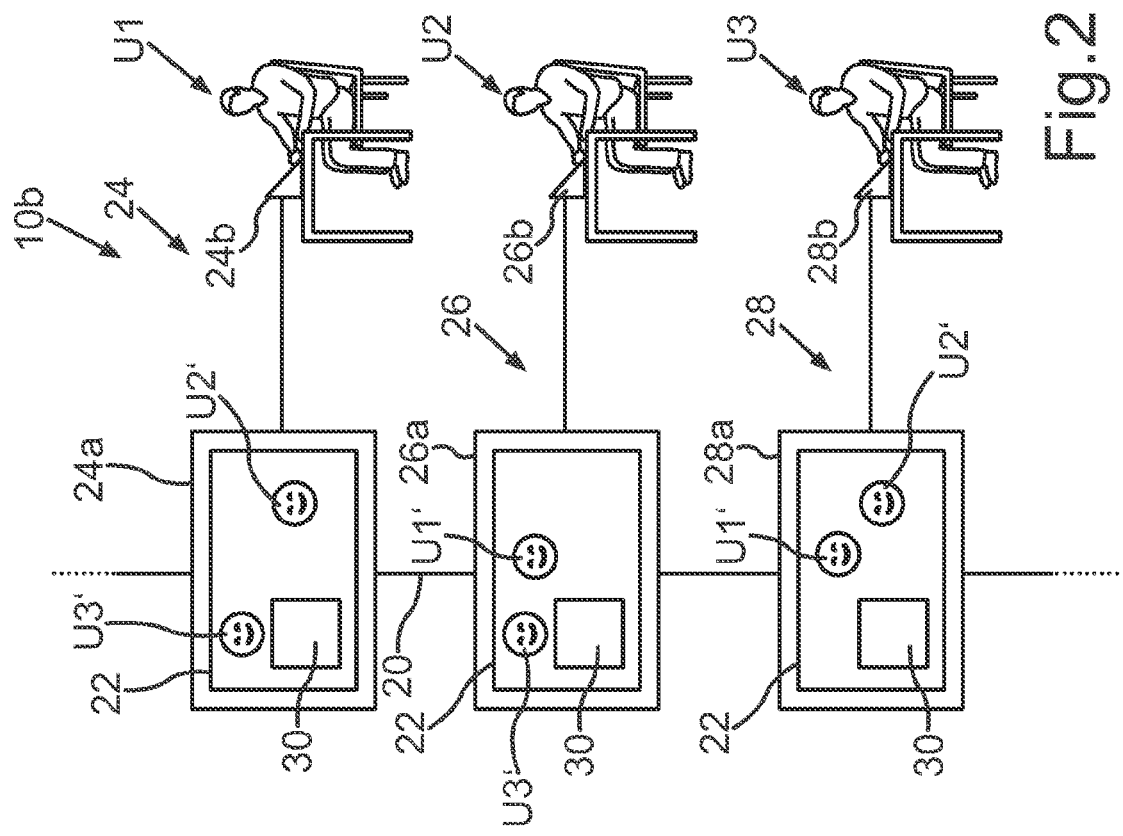

device (12a, 14a, 16a, 18a, 24a, 26a, 28a, 32a) to the second user (U1, U2, U3, U4).

29 Claims, 3 Drawing Sheets

Related U.S. Application Data continuation of application No. 15/750,066, filed as application No. PCT/EP2016/068817 on Aug. 5, 2016, now Pat. No. 10,565,770.

(51) Int. Cl.
*G06Q 10/10* (2012.01)
*H04N 7/15* (2006.01)
*G06V 40/16* (2022.01)

(56) References Cited

U.S. PATENT DOCUMENTS

| | | |
|---|---|---|
| 8,539,359 B2 | 9/2013 | Rapaport et al. |
| 2006/0004680 A1 | 1/2006 | Robarts et al. |
| 2009/0254843 A1* | 10/2009 | Van Wie ............... H04L 67/131 |
| | | 707/999.005 |
| 2010/0185640 A1 | 7/2010 | Dettinger et al. |
| 2013/0016124 A1 | 1/2013 | Han et al. |
| 2013/0257876 A1 | 10/2013 | Davis |

* cited by examiner

COMMUNICATION SYSTEM AND METHOD FOR PROVIDING A VIRTUAL MEETING SPACE

CROSS-REFERENCE TO RELATED APPLICATIONS

This application is a continuation of U.S. patent application Ser. No. 16/737,803, filed on Jan. 8, 2020, which is a continuation of U.S. patent application Ser. No. 15/750,066, filed on Feb. 2, 2018, which is the national phase entry of Intl. Patent App. No. PCT/EP2016/068817, filed on Aug. 5, 2016, which claims priority to EP Patent App. No. 15180273.3, filed on Aug. 7, 2015, where all are hereby incorporated by reference.

The invention relates to a method for operating a communication system for providing a virtual meeting of at least one first user and at least one second user, wherein the communication system comprises at least one first communication device associated with the at least one first user and at least one second communication device associated with the at least one second user. Moreover, the at least one first communication device comprises a first display device and the at least one second communication device comprises a second display device. Furthermore, a virtual meeting space is displayed on the at least one second display device.

Such communication devices may be computers, mobile virtual reality or augmented reality glasses, tablets or smart phones, which can be communicatively coupled for example over a network, like the internet. Also devices like virtual reality glasses, which enable a user to see a virtual environment, are known from the prior art. It is also known, in the majority of cases in the context of games, to animate avatars, which usually are prototyped and which are shown in games to represent a user. The main area of application of such virtual realities lies in the field of entertainment and games. But it would be desirable to make use of such virtual realities also in other fields, especially in the field of human interaction. However, other aspects have to be taken into consideration taking account of specific requirements of such different fields of application.

Therefore, it is an object of the present invention to provide a communication system and a method for operating a communication system, which provide new utilization possibilities for virtual environments, especially with adaptabilities taking into account the requirements of such new utilization possibilities.

This object is solved by a communication system and a method for operating a communication system with the features of the respective independent claims. Advantageous embodiments of the invention are presented in the dependent claims.

According to the invention a method for operating a communication system for providing a virtual meeting of at least one first user and at least one second user is provided, wherein the communication system comprises at least one first communication device associated with the at least one first user and at least one second communication device associated with the at least one second user. Moreover, the at least one first communication device comprises a first display device and the at least one second communication device comprises a second display device. According to the method a virtual meeting space is displayed on the at least one second display device. Furthermore, user related data related to the at least one first user are provided and at least one first displaying characteristic of a first object is determined in dependency on the provided user related data according to a set degree of variance of the user related data. Also, the first object is displayed with the determined at least one first displaying characteristic according to the set degree of variance within the virtual meeting space displayed on the second display device to the at least one second user.

This way, objects, especially virtual objects, like an avatar representing the first user, can be presented to the second user over any distance, which can advantageously be used to provide virtual meetings between different users, especially any arbitrary number of users, in a common virtual meeting room. A further great advantage of the invention is that the first object presented to the second user can be adapted to user related data, e.g. biometric characteristics of the first user, by means of the displaying characteristic. Therefore, any kind of objects or the avatar or the meeting space can be displayed personalized and also animated using the data related to the first user. While in most, especially gaming related situations the objective is to realize most realistic animations and representations, a special advantage of the invention is based on the finding that such a unrestrictedly realistic personalization might not be desirable or appropriate in each situation. Sometimes it can also be valuable to exclude certain information relating to the user related data, from being displayed or represented by the displayed object, e.g. information, which may not be relevant or even disruptive for the purpose of the meeting. Also the first user might not wish being represented personalized to others, maybe not well-known, participants of the meeting. Therefore, by determining the displaying characteristic according to a set degree of variance, it is possible to vary the user related data when displayed as corresponding displaying characteristic according to a certain degree, e.g. it is possible to display the first object with the displaying characteristic e.g. only with a certain level of realism, variance or abstraction, depending on the preferences of the user or the purpose of the meeting.

This allows for example for virtual characters being represented with various degrees of biometric animation ranging from simple, static and symbolic representations to a biometrically animated cartoon character to fully photo realistic representations of a person. Also objects not representing a person can be represented according to the set degree of variance or preference in the virtual scene. These objects can be displayed fully realistic but also partially or completely reduced in realism and resolution depending on the task or kind of the meeting. Also cultural data of the users, like nationality, social, professional, corporate or functional background can be involved to determine the kind or appearance of the virtual meeting room and objects therein, like with colors or color schemes typical for certain nations, companies, organizations, purposes etc. So all kind of user related data can be used for personal adaption of all kind of objects presented in the virtual meeting space, however advantageously the degree of usage of those data can be purposefully controlled by the set degree of variance.

According to an advantageous embodiment of the invention the user related data are at least one of:
- at least one biometric characteristic of the at least one first user;
- stored personal user data;
- environmental data related to the environment of the at least one first user;
- performance data related to the at least one first user or the environment.

Providing a biometric characteristic of the at least one first user is particularly advantageous, especially when the first object is a virtual character representing the first user, as it allows for adapting and/or animating the at least one first object to user specific characteristics and behaviour. Such adaptions by biometric characteristics of the first user are especially important for human interaction. For example the addition of gaze directions, eye blinking or mimics as biometric characteristics to virtual characters in the virtual meeting space can greatly improve empathy and perception of the person. In many situations, especially in international, professional or other intercultural contact it has been determined as useful to modulate and moderate individual behavior and appearance to either tone it down, bias or amplify it to support the purpose of the interaction and communication. Therefore, by means of the invention a virtual environment can be provided, in which people can virtually meet with various degrees and/or templates of personalization from low to very high, from very profiled to very toned down, adaptable for the specific purpose of the meeting or user preferences.

Also other stored personal user data are very advantages and allowing further personalization of the virtual meeting space and can advantageously also be taken into consideration. By means of such personal user data also cultural background or social background of the user can be specified, like nationality, age, gender, etc. and the virtual character or other objects in the virtual meeting space can be adapted accordingly.

The user related data can advantageously also relate to environmental data related to the environment of the at least one first user. If for example the first user is sitting in a chair behind his desk, or on a couch in his sitting room, he can be represented to the second user as an avatar sitting in a chair or on a couch correspondingly. Such environmental data can also relate to the cloths the first user is currently wearing, so that the avatar representing the first user can be displayed with corresponding clothing colours.

Therefore, the invention allows for a virtual meeting space, which can be made optimally fit for any purpose and participant by biometric, cultural and social adaption. Preferably, the first and second communication devices are communicatively coupled to each other. Also, the at least one first communication device preferably comprises sensing means and/or a storage device for providing the user related data related to the at least one first user. Moreover, not only objects, like the first object, can be presented to the second user in dependency of the user related data of the first user, but also the other way round. Therefore it is an advantageous embodiment of the invention, when also the at least one second communication device comprises sensing means and/or a storage device for providing second user related data related to the at least one second user, wherein the first display device displays the virtual meeting space with the first virtual object and/or a different second virtual object with a second displaying characteristic determined in dependency of the second user related data related to the second user according to one of the settable degrees of variance.

The virtual meeting space therefore is displayed to both, the first and second user, on their respective display devices. The virtual meeting space can comprise objects, like furniture, one of which can be the first object, which therefore can be presented to the second user as well as to the first user at the same time. Further, the second user can also be represented by an avatar in the virtual meeting room, which then would constitute above named different second virtual object. Preferably the avatar representing the second user is displayed on the first display device associated with the first user but not necessarily on the second display device associated with the second user. Also the avatar representing the first user not necessarily has to be presented on the display device of the first user himself. A potential third avatar or more avatars representing a third or more users would be visible to the first and second user and depending on the setup of the room and meeting to each other or each or some users would take a first person perspective and only see avatars representing other users depending on their position and field of view in the virtual space.

The set degree of variance may be the same for the second user, but also may be different. E.g. a global setting for a meeting session may be provided, or alternatively each user can set the degree of variance according to his/her own preferences. So preferably the set degree of variance is one of a plurality of settable degrees of variance.

Moreover, above described embodiment applies especially to any arbitrary number of users or participants of such a virtual meeting, each one associated with a corresponding communication device. Such a communication device, like the first and second communication devices, can be for example be a computer, a tablet PC, a smart phone, virtual reality glasses, head-mounted displays, etc. The communication devices can be configured to display the virtual meeting space in 2D or also in 3D. The communication devices can be communicatively coupled to each other by a network like a local area network or also the internet to provide interactions between participants all over the world. The sensing means for sensing the user related data, especially biometric characteristics, preferably comprise a camera and may be configured as eye-tracker, head-tracker, a device for tracking facial expressions or mimics, or tracking gestures. The sensing means can also comprise a device for measuring GSR (galvanic skin response) or EEG or others. Therefore the sensing of the user related data, like the biometric characteristics, can include biometric measures of a user such as eye-tracking, facial expression tracking, gesture tracking and so on. Especially such biometric characteristics can greatly facilitate human interaction.

Therefore it is another advantageous embodiment of the invention that as the at least one first biometric characteristic at least one of the following features of the at least one first user is captured:
- an eye feature, especially a gaze direction, eye blinking, pupil diameter, pupil diameter changes, wherein these eye features can be for example be captured by eye tracking;
- facial characteristics, especially facial features, face geometry, facial expressions, mimics, wherein these facial characteristics can for example be captured by face tracking and/or face recognition and/or facial expression tracking:
- a body feature, especially body geometry, gestures, movements, wherein these body features can be captured for example by gesture tracking and/or head tracking;
- a color, especially hair color, eye color, skin color, a color of a piece of clothing; and
- a vital sign, especially a heart rate, a blood pressure and/or a body temperature.

Especially features relating to the face of a human like facial characteristics and eye features are very important for human interaction and communication and therefore this embodiment of the invention is especially advantageous for providing social meetings in a virtual environment. Moreover, also other biometric characteristics can be captured, which for example relate to emotional states of the user, which can be captured for example by EEG or GSR. Therefore a great variety of adaption is provided. By means of the capturing of one or more of above named biometric characteristic especially an avatar representing the at least one first user can be provided, which can stylistic for a high level of variance, however for a low level of variance it can be a live image enhanced with biometric indications such as emotion, arousal, etc. and also matching the outer appearance of the respective user and therefore being highly personalized. Furthermore, the user related data can be collected based on performance or achievement of a certain task or interaction with an object. Thus, the other users can be made aware of certain process, object, performance or other aspects relevant to the interaction or communication.

The invention and it's embodiments are therefore especially advantageous, when, the first object is a first character, especially a virtual character like an avatar, representing the at least one first user. Advantageously, the measured biometric characteristic of the first user can be applied to an avatar by means of the corresponding displaying characteristic and be presented to the second user according to the set degree of variance, especially one of a plurality of settable degrees of variance, and also the other way round.

According to another advantageous embodiment of the invention the user related data, especially the at least one biometric characteristic, are captured, especially by the sensing means, continuously during the virtual meeting, wherein the determining of the at least one first displaying characteristic and the displaying of the at least one first object are correspondingly continuously updated. As already mentioned this embodiment is especially advantageous for providing a live animation of the avatar representing the first user. So, the avatar can be animated to emulate according to the set degree of variance the gestures and/or mimics and/or eye movements and/or blinking, etc., the first user is currently performing. Therefore, the at least one determined first displaying characteristic, with which the first virtual character is displayed, corresponds according to the set degree of variance to the at least one biometric characteristic of the at least one first user. So, if the first user performs a certain gesture, the avatar may perform the same gesture as well, if the first user is smiling, the avatar may be smiling as well, if the first user blinks, the avatar may blink as well. Therefore, if the biometric characteristic relates to movement a certain body part of the user, like the eye, the face, the head, the arms or the legs, the displaying characteristic, with which the first virtual character is displayed, may correspond to a movement of the same body part of the virtual character.

On the other hand, biometric characteristics of the first user can also be captured or sensed in advance of the meeting and be stored, like corresponding patterns of typical gestures, blink behavior, etc. of the first user, which can then be read out from the storage device during the virtual meeting to provide corresponding displaying characteristics of the avatar according to the set degree of variance.

Also the biometric animation can be modulated or moderated. For example, if a user never smiles a smile from a recording can be animated. Alternatively, if a user tends to smirk this can be ignored for the animation.

But not only virtual characters representing users can be adapted, but also any other object presented in the virtual meeting space. Therefore, according to another advantageous embodiment of the invention, the at least one first object or at least one third object, which is displayed within the virtual meeting space, is an object not representing a real person, especially a room or virtual environment, which is displayed as the virtual meeting space, at least one component of the displayed room or virtual environment and/or a furnishing object of the displayed room and/or an object of interest and/or of the meeting presented in the virtual meeting space. This way it is possible, for example to modify clothing colors. Similarly, background colors and decoration of a room or other virtual material presented in the virtual room can be adapted. The same applies to shapes, contrasts, light, and other visualization properties of the virtual meeting space. These objects as the at least one first object can also be displayed with a displaying characteristic in dependency of the user related data. E.g. colors or decoration can be presented in dependency of the nationality or age or gender of the respective users, especially the virtual meeting room and its objects besides avatars, can be displayed to each user according to his/her own personal user data, and again according to the set degree of variance. However, these objects can be also third objects, which not necessarily are displayed with displaying characteristics in dependency of user related data and also not according to the set degree of variance. Instead the appearance of the virtual meeting space or meeting room and its components, lighting conditions and other decoration can be determined in dependency of predefined templates, which are explained later in more detail. E.g. different templates can be predefined different companies, for different meeting purposes, for different nations, etc. and these templates then define the appearance of the room and above named objects correspondingly.

According to another advantageous embodiment of the invention the first object and/or the at least one third object is displayed as virtual object, especially in the form of a computer generated graphic, and/or as at least part of a real image of a real object. Especially the virtual meeting space environment and/or background, i.e. the room design such as dimensions, furniture, windows, light, colors, wall and other decoration, and other objects in the virtual meeting space can be presented as a fully virtual environment, but also as mixed reality environment, where e.g. the virtual meeting space is partly represented and filled with real data from a real room or space and some real objects that are integrated into the virtual meeting space based on real images captured of these real components or other measures. Also the virtual meeting space can be displayed in form of a representation, especially also a live representation, of a real space based on images, videos or other live or pre-set measures of a real room.

If the virtual meeting space comprises components, which are computer generated graphics, this has the advantage that these virtual components can be animated. Ways of animation are e.g. time animation e.g. by illumination, climate animation e.g. by colors, sound, etc., mood animation e.g. by modifying decoration, colors, and special arrangement change, e.g. seating, tables, dimensions of room and furniture. Also some objects in the virtual meeting space can be measured and/or animated separated and/or differently from the environment to achieve a specific objective with a specific object or set of objects. E.g. only the paintings on the wall could change the content in an animated way like the paintings in Harry Potter's Hogwarts School. In the virtual meeting space also objects constituting virtual communication tools, such as monitors, screens, whiteboards, message boards, objects for discussion (3D CAD designs, design models, plans . . . ), can be displayed on each of the displaying devices of the respective users so that advantageously the user can virtually interact with each other by means of such virtual communication tools. These tools can also be animated by all ways of displaying information, like change in resolution, color scheme, size, zoom, orientation, display information layers.

Moreover, the degree of animation can also be determined in dependency of the set degree of variance. E.g. for business meetings a high degree of variance can be set involving low personalization and animation of avatars and a low degree of animation of the virtual meeting space and its components, and for private virtual meeting a low degree of animation can be set involving a high degree of personalization and animation of the respective avatars and a high degree of animation of the virtual meeting space and its components.

These objects can be displayed fully realistic but also partially or completely reduced in realism and resolution depending on the task or kind of the meeting. Different kinds of virtual meetings might be for example a business meeting or a private meeting like a virtual meeting with friends. In case of a business meeting the degree of variance may be low, which may imply that only biometric characteristic relating to the movement of the user, like gestures, movement, movement of eyes, like the gaze direction, movement of the eye lid, for example blinks, may be represented by the displaying characteristic of the virtual character, whereas biometric characteristic relating to the appearance of the user, like colors, e. g. hair color or skin color, the size or shape of his body or body parts, are not represented realistically, instead a uniform appearance of the character can be chosen to be displayed in the virtual scene. In case of a meeting with friends a high degree of variance can be chosen. As a result, such a bionic virtual meeting space could allow a moderator or organizer and/or participant to choose e. g. the level of engagement and the degree of cultural and personal adaption of a meeting space including its objects and characters from e. g. very factual and data minded reducing emotional triggers to the minimum to a highly affective setting, or from a uniform to a highly culturally or socially adapted setting.

So in general preferably the degree of variance defines a level of abstraction, according to which the at least one first displaying characteristic is abstracted and/or limited and/or transformed compared to the corresponding user related data and/or defines how many and/or to which degree and/or which of the user related data are represented by the at least one first displaying characteristic.

Such a design, namely the setting of the degree of variance, could be static or adaptive over the course of a meeting, again either centrally driven by the moderator or organizer or by each participant, delegate or the respective delegating organization. Therefore, this advantageous embodiment of the invention manages to link animation with the purpose of the meeting and the background of the participants and their personalities.

Furthermore, the degree of variance can be set in dependency on a received user input, like of the first and/or second user or each user individually or of the moderator or organizer, which may but have not to be a participant of the meeting himself/herself. This user input is specifying the degree of variance of the plurality of different degrees of variance. On the other hand, this degree of variance could also be set indirectly by the user, which may for example choose a certain template defining that the virtual meeting is a business meeting or a meeting with friends, and the communication system sets the degree of variance in dependency on the kind of a meeting, specified by the user. So, if finally the degree of variance is set, advantageously the second display device displays the first object, especially the first virtual character, with displaying characteristic, according to the set degree of variance. The same applies also for the second character representing the second user or in general for every character representing further users. Either, each user can choose the degree of variance of his character by himself, or the setting of the degree of variance can be a global setting for all the users depending on a specified kind of the virtual meeting. This greatly enhances the matching quality between purpose of meeting, human gatherings and the respective background of the participants. The optimal alignment of these aspects allows higher effectiveness and efficiency and human interaction over distances and for any size of group from two to very many.

Also, especially if the user related data relate to at least one biometric characteristic of the first user, preferably the at least one determined first displaying characteristic with which the first character is displayed, corresponds to the at least one first biometric characteristic of the at least one first user, especially wherein the degree of variance defines a level of similarity between the at least one first biometric characteristic and the corresponding at least one first displaying characteristic.

This degree of variance may for example define which of several capturable biometric characteristics of the first user are taken into consideration when determining the displaying characteristic. If the degree of variance is low, only predefined captured gestures of the user may be taken into consideration when determining the displaying characteristic and be represented by the avatar, whereas the representation of other gestures or mimics can be omitted. So for a set degree of variance a certain subgroup of all capturable biometric characteristics could be chosen, be captured and represented by the displaying characteristic. Also all of the capturable biometric characteristics could be captured and represented with a certain level of abstraction corresponding to the degree of variance, e.g. the lower the degree of variance, the lower the level of abstraction. Therefore this embodiment provides many possibilities of modifying the degree of variance.

According to another advantageous embodiment of the invention a plurality of predefined templates are selectable, each template comprising at least one template parameter, wherein if one of the plurality of templates is selected, the virtual meeting space and/or the at least one first object is displayed in dependency on the at least one template parameter of the selected template.

So advantageously, similar to document templates in PowerPoint or Word different meeting templates can be provided, however, these could include live animation and modulation with purpose and background. Advantageously, the user does not have to select each single option like the degree of variance, the use of further information like personal user data, the room design, and so on, separately, instead the user can select one from several different templates, which then define by means of their respective template parameters, which settings have to be chosen for the respective meeting. So for example these templates can specify the kind of the meeting or the purpose of the meeting, wherein the respective template parameters are specifically adapted to the kind of purpose of meeting, like a business meeting, a corporate design, a cultural profile etc. Also users may define their personal templates themselves, e.g. by modifying and/or defining corresponding template parameters.

Preferably, the at least one template parameter defines at least one of a certain degree of variance or a certain range of degrees of variance of the plurality of degrees of variance, a kind and/or appearance of a virtual room or a virtual environment displayed in the virtual meeting space, a color scheme, the at least one first object, which is displayed in dependency of the provided user related data according to the set degree of variance, of a plurality of objects within the virtual meeting space, a purpose and/or certain classification of the virtual meeting, a kind and/or appearance of third objects displayed in the virtual meeting space. Moreover, such template parameters could also specify whether additional personal user data different from the biometric characteristic may be used or not, or also which of them, which is explained later in more detail. So advantageously, for example background colors and decoration of a room, shapes, contrasts, light, and other visualization properties can be specified by the respective template parameters of a certain template and this way be optimally adapted for the purpose or kind of meeting. Templates can be provided e.g. company specific and/or nationality specific or also purpose specific.

Additionally means of stored personal user data also cultural background or social background of the user can be specified and the virtual character or other objects and the virtual meeting space can be adapted accordingly.

Preferably, the stored personal user data comprise information about a biological and/or social property and/or a professional information of the at least one first user, especially at least one of a nationality, a gender, an age, a skill, an education, an income level, a marital status, a cultural background, an organisation, a company and an association. This allows for example to modify clothing colors to the cultural mix of participants in a meeting as the meaning of colors is quite between for example Western and Eastern cultures. Also the already mentioned background colors and decoration of a room, and so on, could be adapted culturally. Also in case of a business meeting colors typical for the company of the participants can be used. These personal user data can be predefined by a user input and/or by registration data of at least one first user. Also here, a degree of variance of a plurality of degrees of variance of the personal user data by the corresponding displaying characteristic may be settable in a similar way as described with regard to the degree of variance of at least one first biometric characteristic by the corresponding at least one first displaying characteristic. Also the degree of variance can combine both, namely the degree of variance of the at least one first biometric characteristic and the personal user data by one or more corresponding first displaying characteristic. Also such a degree of variance referring to the personal user data can advantageously be specified by the respective template parameters of above-named templates.

The invention further relates to a communication system for providing a virtual meeting of at least one first user and at least one second user, wherein the communication system comprises at least one first communication device associated with the at least one first user and at least one second communication device associated with the at least one second user, wherein the at least one first communication device comprises a first display device and the at least one second communication device comprises a second display device, wherein the second display device is configured to display a virtual meeting space. Moreover, the first communication device is configured to provide user related data relate to the at least one first user and the communication system is configured to determine at least one first displaying characteristic of a first object in dependency of the provided user related data according to a set degree of variance of the user related data. Also, the communication system is configured to display the first object with the determined first displaying characteristic according to the set degree of variance within the virtual meeting space on the second display device.

The preferred embodiments and advantages thereof described with regard to the method for operating a communication system according to the invention correspondingly apply to the communication system according to the invention, wherein in particular the embodiments of the method according to the invention constitute further preferred embodiments of the communication system according to the invention. Especially, the communication system according to the invention is configured to perform the method for operating a communication system according to the invention and/or its preferred embodiments.

Further features of the invention and advantages thereof derive from the claims, the figures, and the description of the figures. All features and feature combinations previously mentioned in the description as well as the features and feature combination mentioned further along in the description of the figures and/or shown solely in the figures are not only usable in the combination indicated in each place but also in different combinations or on their own. The invention is now explained in more detail with reference to individual preferred embodiments and with reference to the attached drawings.

Figure 1:
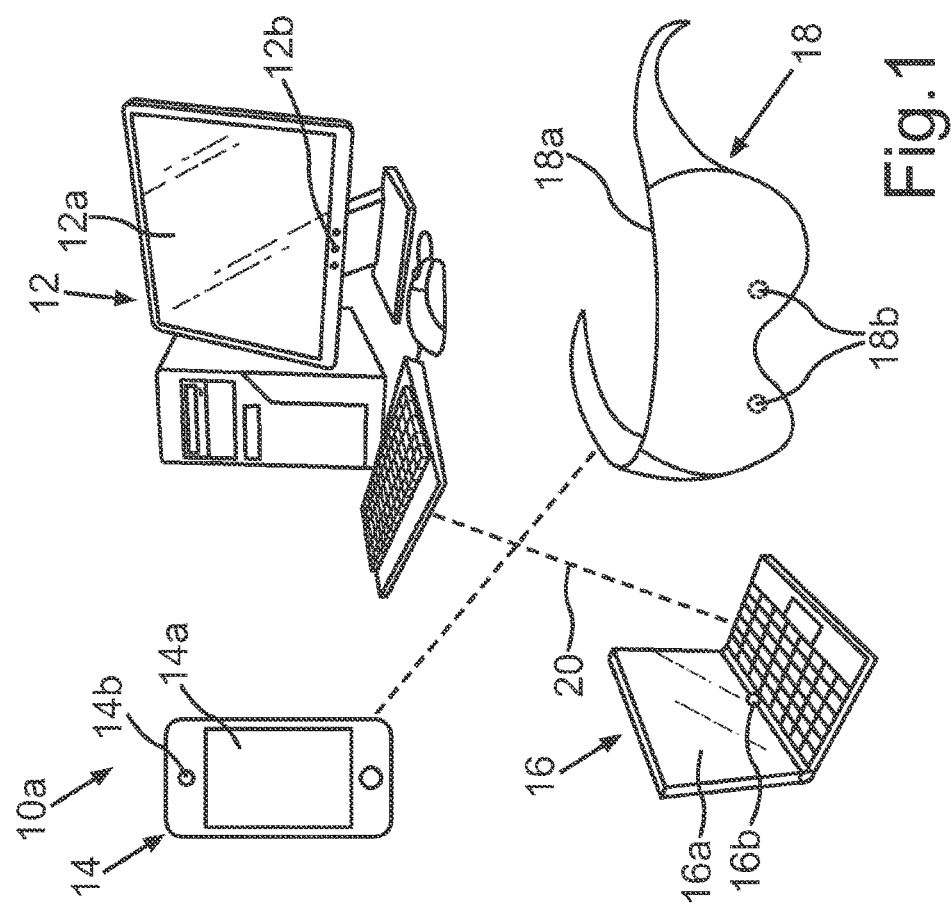
Figure 3:
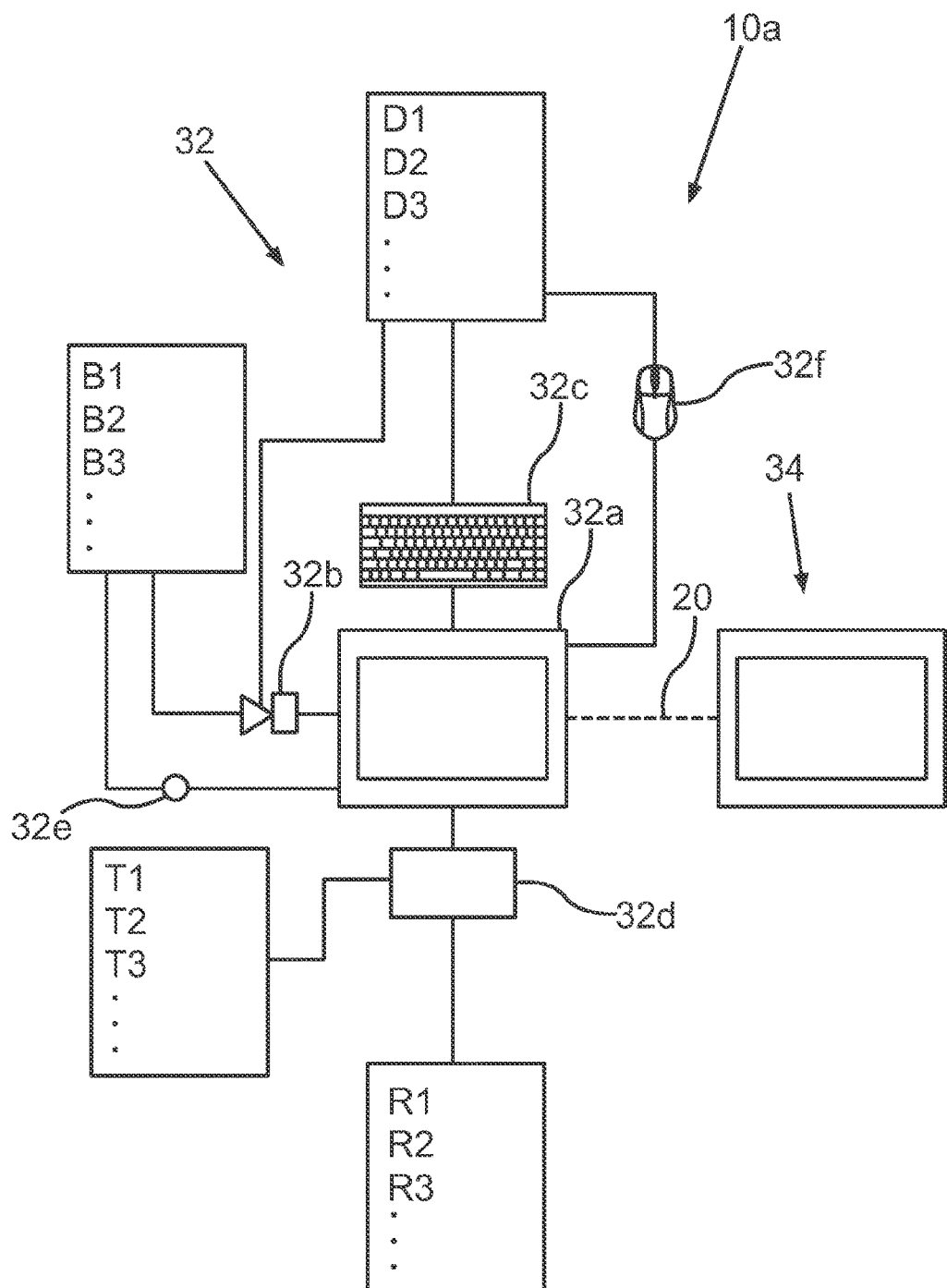
Figure 4:
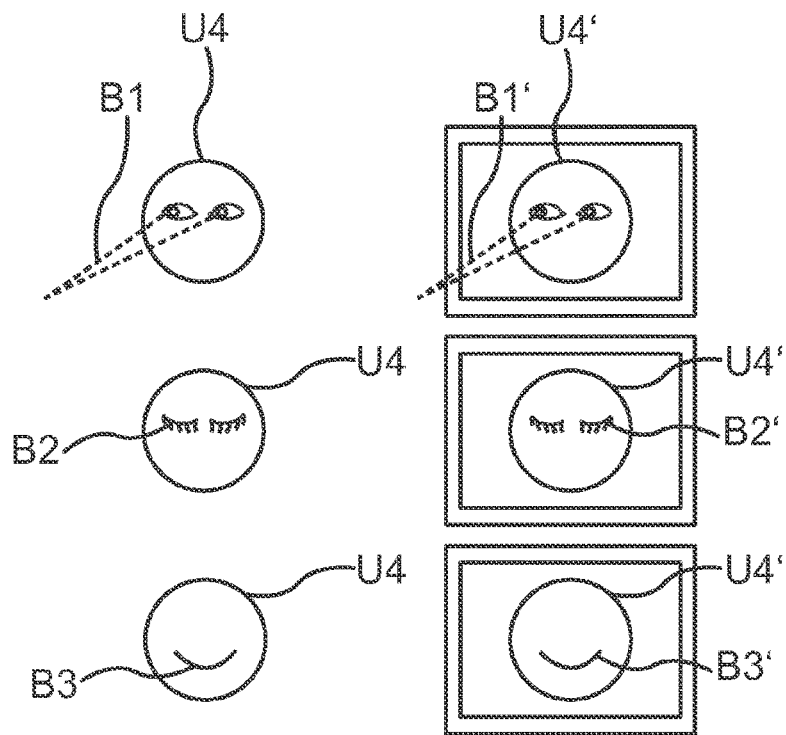
Figure 5:
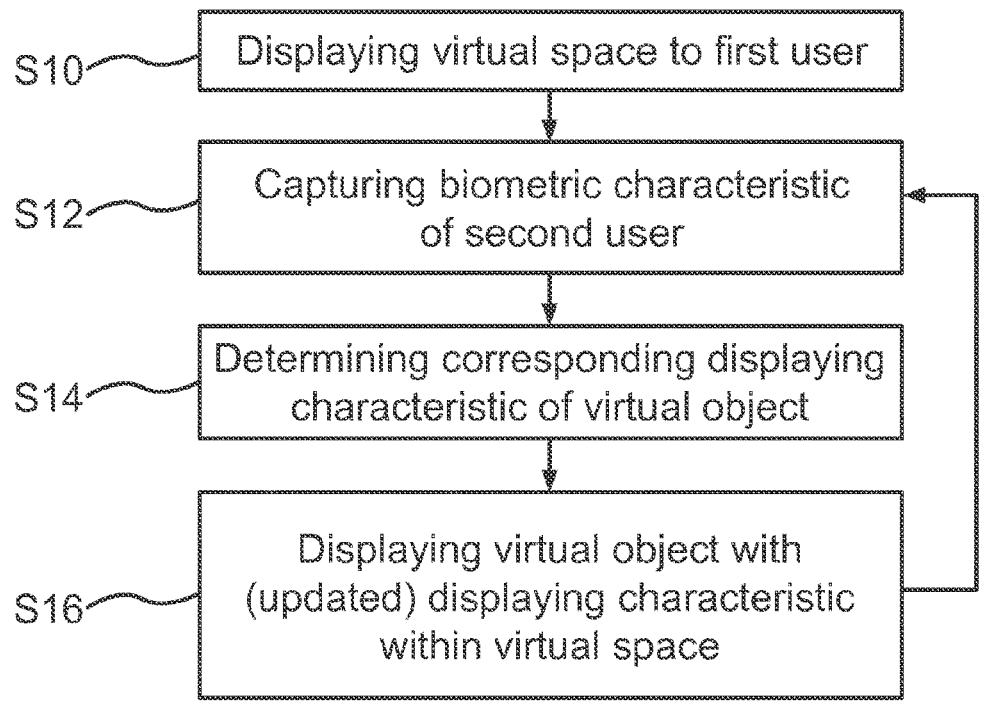

These Show in:

FIG. 1 a schematic illustration of a communication system according to an embodiment of the invention;

FIG. 2 a schematic illustration of a communication system providing a virtual meeting room for a plurality of participants according to an embodiment of the invention;

FIG. 3 a schematic illustration of a communication system according to another embodiment of the invention for illustrating the determining of displaying characteristics of objects in a virtual meeting space in dependency on biometric characteristics and other user data;

FIG. 4 a schematic illustration of different biometric characteristic and their corresponding virtual representation; and FIG. 5 a flow chart for illustrating a method for operating a communication system according to an embodiment of the invention.

FIG. 1 shows a schematic illustration of a communication system 10a comprising at least two communication devices. In this example four different communication devices are shown, which can be configured as computer 12, smart phone 14, note book 16, and a head mounted device 18 in the form of a head-mounted display or virtual reality glasses. These devices 12, 14, 16, 18 are communicatively coupled by means of a network 20, like the internet. Each of the communication devices 12, 14, 16, 18 comprises a respective display 12a, 14a, 16a, 18a, which can be configured to provide 2D images or also 3D images. Moreover, each of the communication devices 12, 14, 16, 18 comprises sensing means, like one or more sensors, for capturing biometric characteristics of the respective users of these communication devices 12, 14, 16, 18. For example the computer 12, the smart phone 14, and the note book 16 each comprise a camera 12b, 14b, 16b for capturing images of the respective users, on the basis of which eye-tracking, head-tracking, facial expression tracking, or movement tracking can be performed. Also other biometric characteristics of the users can be captured like hair color, skin color, size, shape, contours, and so on. Also the head-mounted device 18 comprises cameras, which are configured as two eye cameras 18b for capturing images of the respective eyes of the user. On the basis of these images biometric characteristics like eye color, gaze direction, eye blinks, eye positions, eye contours, skin color, etc. can be captured. Optionally, these communication devices 12, 14, 16, 18 also can be coupled or provided with further sensing means or sensors, and also be provided with input means, like a mouse, a keyboard, touch screens and so on. With regard to the head-mounted device 18, input means can be provided in form of gaze control so that the user can make selections of options displayed on the head-mounted device by means of his gaze, which can be determined on the basis of the eye images captured by the eye cameras 18b. By means of these input devices, the users can provide the communication system 10 with additional personal user data, like age, gender, nationality, profession, and so on. The communication system 10 is further configured to display on the respective display devices 12a, 14a, 16a, 18a a virtual meeting space, like a virtual room or a virtual environment, which can be advantageously adapted to individual preferences, the purpose of meetings or cultural background of the respective users due to the captured biometric characteristic and personal user data of the respective users, which is explained in more detail with regard to FIG. 2.

FIG. 2 shows a schematic illustration of a communication system 10b for providing a virtual meeting room 22 according to another embodiment of the invention. The communication system 10b again comprises different communication devices, each associated with a respective user U1, U2, U3. In this case, a first communication device 24 comprising a first display device 24a and a first capturing device 24b for capturing biometric characteristics is associated with a first user U1, a second communication device 26 comprising a second display device 26a and a second capturing device 26b for capturing biometric characteristics is associated with a second user U2, and a third communication device 28 comprising a third display device 28a and a third capturing device 28b for capturing biometric characteristics is associated with a third user U3. Again, these devices 24, 26, 28 are communicatively coupled via a network 20. These users U1, U2, U3 now virtually meet in a virtual meeting room 22, which is shown on each of the respective display devices 24a, 26a, 28a. In this virtual meeting room, each user U1, U2, U3 is represented by a virtual character U1', U2', U3, especially such that the virtual characters U1', U2' representing the first user U1 and the second user U2 are presented to the third user U3, the virtual characters U2', U3' representing the second user U2 and the third user U3 are presented to the first user U1, in particular in the same virtual meeting room 22, and so on. Moreover, objects 30 different from the displayed characters U1', U2', U3' can be displayed as well. This virtual meeting room 22 can be for example meeting room for a business meeting, a classroom, a lecture hall, presentation spaces at conferences or sport stadiums or others. Now advantageously the character U1', U2', U3' can be displayed with various degrees of biometric animation in dependency on the respective biometric characteristics of the users U1, U2, U3 captured by means of the respective capturing devices 24b, 26b, 28b. For example the first virtual character U1' corresponding to the first user U1 can be shown to the other users U2, U3 on their respective display devices 26a, 28a comprising displaying characteristics corresponding fully or only in part or according to a certain degree to the biometrics of a first user U1. So these characters U1', U2', U3' can be adapted to the appearance of the respective users U1, U2, U3, by having their hair color, their eye color, having the same color of clothes, and so on, and also simulate movements like eye blinks, eye movements, movements of body parts like gestures and mimics. Also other information like personal user data can be used to adapt the appearance of the virtual meeting room 22 and objects 30 therein. Due to the use of these biometric and personal data a virtual meeting space can be provided, which can be made optimally fit for any purpose and participants by biometric and personal adaption. However, sometimes depending on the kind of the meeting it might be advantageous, to exclude certain personal information, which is not relevant for the objective or purpose. Therefore it is preferred that the degree of variance of the personal data and biometric characteristics of each of the users U1, U2, U3 can be set, either individually by each of the users U1, U2, U3 or globally depending on the specified kind of meeting, which is explained in more detail with regard to FIG. 3.

FIG. 3 shows a schematic illustration of a communication system 10c according to another embodiment of the invention. The communication system 10c again comprises at least two communication devices 32, 34, which are communicatively coupled by means of a network 20 and of which one is shown in more detail for illustrating the determining of displaying characteristics of objects in the virtual meeting space in dependency of biometric characteristics and other user data. The communication device 32 then comprises a display device 32a, sensing means 32b, 32e, one of which is configured as a camera 32b, user input means, like a keyboard 32c, a computer mouse 32f and a storage device 32d for storing data. The camera 32b is configured to capture one or more biometric characteristics B1, B2, B3 of a user, which can be done by various biometric measures like eye tracking, gaze tracking, head tracking and so on. Also other sensing means like GSR or EEG, which are denoted with 32e in FIG. 3, can be used. These biometric characteristics B1, B2, B3 can be captured once and saved to the storage device 32d, like biometric characteristics that do not change (much) at least over short-time ranges, like biometric characteristics relating to the appearance of the user, like hair color, eye color, skin color and so on. Other biometric characteristics B1, B2, B3, especially those relating to the movement of the user, are tracked during a meeting and represented in real time by a representation of the user as his virtual character with the displaying characteristic, which can be updated correspondingly. Further, information about a user like personal user data D1, D2, D3 can be input into the system by means of the input devices 32c and also be stored to the storage device 32d and used for determining the displaying characteristics of the virtual meeting room 22, its objects 30, and characters. Besides the typical input devices like a keyboard 32c or a mouse 32f, also the camera 32b as part of an eye tracking device can serve as input device, enabling gaze based user input. Further input means could be input by speech, gesture recognition, etc. Moreover, a plurality of 30 degrees of variance R1, R2 R3 can be predefined and for example also be stored on a storage device 32d. When starting a virtual meeting the user can for example first choose one of these degrees of variance R1, R2, R3. Accordingly, the communication system 10c displays the virtual meeting space with a virtual character representing the user associated with a first communication device 32 on the display device of the second communication device 34 according to the selected degree of variance R1, R2, R3. So the communication system 10c determines the displaying characteristic of the virtual character in dependency on the biometric characteristic B1, B2, B3, optionally in dependency on the personal user data D1, D2, D3 and displays the virtual meeting room with objects, decoration, and a virtual character representing the user with a determined displaying characteristic according to the set degree of variance R1, R2, R3.

Also other settings could be made for example with regard to a color scheme, the kind of objects to be presented or the kind of room to be chosen as virtual meeting room individually by the user or moderator or organizer of the meeting. However, to avoid that a user has to choose every single setting separately, it is preferred to provide several different predefined templates T1, T2, T3, which can also be stored in the storage device 32d. Each of these templates T1, T2, T3 comprises respective template parameters that define for example a certain degree of variance with regard to the biometric characteristic B1, B2, B3 and/or the personal user data D1, D2, D3, the kind and/or appearance of the virtual room or the virtual environment displayed in the virtual meeting space, a color scheme or a kind or appearance of objects displayed in the virtual meeting space and so on. Each of these templates T1, T2, T3 can be specified for a certain purpose or kind of meeting. For example a first of these templates T1, T2, T3 may specify a business meeting, wherein the template parameters specify suitable settings for such a business meeting. A second template may specify suitable settings for a private meeting for example with friends, and so on. So when the user starts a virtual meeting session, he can first choose the template for this meeting and the system 10c automatically sets the setting for this meeting according to the chosen template T1, T2, T3.

Moreover, the virtual meeting session and its respective setting, like the choice of the Templates T1, T2, T3, degrees of variance R1, R2, R3 or transmission and/or animation can be controlled individually, by each participant, i.e. user, or centrally by a group coordinator or be provided as a supervisor control, wherein an overall supervisor sets range and levels of modalities and degrees of animation live and/or offline. Each participant could also choose different animation/display settings to improve his/her understanding of a displayed content such as zoom, contrast, layers or display, especially on his own communication device.

FIG. 4 shows a schematic illustration of some examples of different biometric characteristics B1, B2, B3 of a user U4 and their corresponding virtual representation by the determined displaying characteristic B1', B2', B3'. According to the first example shown in the top of FIG. 4 as biometric characteristic of the user U4, the gaze direction B1 is captured and the user U4 is represented by a virtual character U4' on the display associated with another user, wherein the virtual character U4' is displayed with a corresponding gaze direction B1' as displaying characteristic of the displayed character U4'. In a second example shown in the middle of FIG. 4 as the biometric characteristic of the user U4 an eye blinking B2 is captured. The corresponding virtual character U4' is then displayed with corresponding eye blinking B2' as the displaying characteristic. In a third example shown at the bottom of FIG. 4 as biometric characteristic of the user U4 mimics are captured, especially a smile B3. Consequently the corresponding virtual character U4' is displayed with a corresponding smile B3' as displaying characteristic. Again, the similarity between the biometric characteristic B1, B2, B3 and the corresponding displaying characteristic B1', B2', B3' can be adapted according to the degree of variance R1, R2, R3, as explained before.

FIG. 5 shows a flow chart for illustrating a method for operating a communication system according to another embodiment of the invention. In S10 a virtual meeting space is displayed to a first user, especially by means of a displaying device associated with this first user. In S12 a biometric characteristic of a second user is captured, especially by means of a device associated with a second user. In dependency on this captured biometric characteristic a corresponding displaying characteristic of a object is determined in S14 according to a set degree of variance. Finally, in S16 a object is displayed with a determined displaying characteristic according to the set degree of variance within the virtual meeting space. If the captured biometric characteristic relates to a movement of the user or any body part of the user, the capturing of such a characteristic can be performed by tracking this body part, like eye tracking, or head tracking. In this case the procedure of capturing the biometric characteristic in S12, the determination of a corresponding displaying characteristic in S14 and the final displaying of the object with a displaying characteristic can be performed repeatedly so that each time new information about the biometric characteristic of the second user is derived the corresponding displaying characteristic is determined and the display of the first user is updated correspondingly.

By means of the invention a virtual meeting space can be provided that can be made optimally fit for any purpose and participants by biometric adaption. The great advantage of the invention lies in the matching quality between purpose of meetings, human gatherings, and the respective background of the participants. The optimal alignment of these aspects allows higher effectiveness and efficiency in human interaction over distances and any size of group from two to very many. Finally, the special arrangement could be designed to resemble certain real life settings and could deliberately the same or different for different users. As a result such a bionic virtual meeting space could allow the moderator or organizer, which can be one of the users or a different person, and/or participant to choose the level of engagement and the degree of cultural adaption of a meeting space including its objects and characters from very factual reducing emotional triggers to the minimum to a highly affective setting, or from a uniform to a highly culturally and socially adapted setting that takes into account cultural, sociological, gender, age etc. background.

LIST OF REFERENCE SIGNS 10a, 10b, 10c communication system
12 computer
12a display
12b camera
14 smartphone
14a display
14b camera
16 notebook
16a display
16b camera
18 head mounted device
18a display
18b eye cameras
20 network
22 virtual meeting room
24 first communication device
24a first display device
24b first capturing device
26 second communication device
26a second display device
26b second capturing device
28 third communication device
28a third display device
28b third capturing device
30 object 32 communication device
32a display device
32b camera
32c keyboard
32d storage device
32e GSR/EEG
32f computer mouse
34 communication device
U1, U2, U3, U4 user
U1', U2', U3', U4' virtual character
B1, B2, B3 biometric characteristic
B1', B2', B3', B4' displaying characteristic
D1, D2, D3 personal user data
R1, R2, R3 degree of variance
T1, T2, T3 template

The invention claimed is:

1. A method comprising:
displaying a virtual meeting space on a display device;
determining a level of abstraction associated with a virtual object from among a plurality of different settable levels of abstraction, wherein the level of abstraction is determined based at least in part on hardware capabilities of the display device;
generating a modified virtual object visualized based on the level of abstraction; and
displaying, in the virtual meeting space, the modified virtual object visualized based on the level of abstraction.

2. The method of claim 1, wherein the level of abstraction is further determined based at least in part on a task associated with the virtual meeting space.

3. The method of claim 1, wherein the level of abstraction is further determined based at least in part on a meeting type associated with the virtual meeting space.

4. The method of claim 1, wherein the level of abstraction corresponds to a first level of abstraction, and the method further comprising:
determining a second level of abstraction associated with the virtual object from among a plurality of different settable levels of abstraction based on one or more user inputs from a moderator of the virtual meeting space, wherein the second level of abstraction is different from the first level of abstraction; and
in response to determining the second level of abstraction associated with the virtual object:
generating an updated virtual object visualized based on the second level of abstraction; and
displaying, in the virtual meeting space, the updated virtual object visualized based on the second level of abstraction.

5. The method of claim 1, wherein the level of abstraction corresponds to a first level of abstraction, and the method further comprising:
determining a second level of abstraction associated with the virtual object from among a plurality of different settable levels of abstraction based on one or more user inputs from one or more participants of the virtual meeting space, wherein the second level of abstraction is different from the first level of abstraction; and
in response to determining the second level of abstraction associated with the virtual object:
generating an updated virtual object visualized based on the second level of abstraction; and
displaying, in the virtual meeting space, the updated virtual object visualized based on the second level of abstraction.

6. The method of claim 1, further comprising:
displaying, on the display device, a virtual environment associated with the virtual meeting space that includes the virtual object, wherein the virtual environment is a visualized based on the level of abstraction.

7. The method of claim 1, further comprising:
displaying, on the display device, an avatar associated with a first user of the virtual meeting space, wherein the avatar is a visualized based on the level of abstraction.

8. The method of claim 1, further comprising:
displaying an avatar associated with a first user of the virtual meeting space, wherein clothes of the avatar are visualized based on the level of abstraction.

9. The method of claim 1, wherein the level of abstraction is further determined based at least in part on a room design associated with the virtual meeting space.

10. The method of claim 1, wherein the virtual object corresponds to an avatar.

11. The method of claim 1, wherein the hardware capabilities of the display device include one or more sensors of the display device.

12. An electronic device comprising:
a display device; and
one or more processors to:
display a virtual meeting space on the display device;
determine a level of abstraction associated with a virtual object from among a plurality of different settable levels of abstraction, wherein the level of abstraction is determined based at least in part on hardware capabilities of the display device;
generate a modified virtual object visualized based on the level of abstraction; and
display, in the virtual meeting space, the modified virtual object visualized based on the level of abstraction.

13. The electronic device of claim 12, wherein the level of abstraction is further determined based at least in part on a task associated with the virtual meeting space.

14. The electronic device of claim 12, wherein the level of abstraction is further determined based at least in part on a meeting type associated with the virtual meeting space.

15. The electronic device of claim 12, wherein the level of abstraction corresponds to a first level of abstraction, and wherein the one or more processors are further configured to:
determine a second level of abstraction associated with the virtual object from among a plurality of different settable levels of abstraction based on one or more user inputs from one of a moderator or one or more participants of the virtual meeting space, wherein the second level of abstraction is different from the first level of abstraction; and
in response to determining the second level of abstraction associated with the virtual object:
generating an updated virtual object visualized based on the second level of abstraction; and
displaying, in the virtual meeting space, the updated virtual object visualized based on the second level of abstraction.

16. The electronic device of claim 12, wherein the one or more processors are further configured to:
display, on the display device, a virtual environment associated with the virtual meeting space that includes the virtual object, wherein the virtual environment is a visualized based on the level of abstraction.

17. The electronic device of claim 12, wherein the one or more processors are further configured to:
  display, on the display device, an avatar associated with a first user of the virtual meeting space, wherein the avatar is a visualized based on the level of abstraction.

18. The electronic device of claim 12, wherein the level of abstraction is further determined based at least in part on a room design associated with the virtual meeting space.

19. The electronic device of claim 12, wherein the virtual object corresponds to an avatar.

20. The electronic device of claim 12, wherein the hardware capabilities of the display device include one or more sensors of the display device.

21. A non-transitory computer-readable medium having instructions encoded thereon which, when executed by an electronic device including a display device, causes the electronic device to:
  display a virtual meeting space on the display device;
    determine a level of abstraction associated with a virtual object from among a plurality of different settable levels of abstraction, wherein the level of abstraction is determined based at least in part on hardware capabilities of the display device;
    generate a modified virtual object visualized based on the level of abstraction; and
    display, in the virtual meeting space, the modified virtual object visualized based on the level of abstraction.

22. The non-transitory computer-readable medium of claim 21, wherein the level of abstraction is further determined based at least in part on a task associated with the virtual meeting space.

23. The non-transitory computer-readable medium of claim 21, wherein the level of abstraction is further determined based at least in part on a meeting type associated with the virtual meeting space.

24. The non-transitory computer-readable medium of claim 21, wherein the level of abstraction corresponds to a first level of abstraction, and wherein the instructions further cause the electronic device to:
  determine a second level of abstraction associated with the virtual object from among a plurality of different settable levels of abstraction based on one or more user inputs from one of a moderator or one or more participants of the virtual meeting space, wherein the second level of abstraction is different from the first level of abstraction; and
  in response to determining the second level of abstraction associated with the virtual object:
    generating an updated virtual object visualized based on the second level of abstraction; and
    displaying, in the virtual meeting space, the updated virtual object visualized based on the second level of abstraction.

25. The non-transitory computer-readable medium of claim 21, wherein the instructions further cause the electronic device to:
  display, on the display device, a virtual environment associated with the virtual meeting space that includes the virtual object, wherein the virtual environment is a visualized based on the level of abstraction.

26. The non-transitory computer-readable medium of claim 21, wherein the instructions further cause the electronic device to:
  display, on the display device, an avatar associated with a first user of the virtual meeting space, wherein the avatar is a visualized based on the level of abstraction.

27. The non-transitory computer-readable medium of claim 21, wherein the level of abstraction is further determined based at least in part on a room design associated with the virtual meeting space.

28. The non-transitory computer-readable medium of claim 21, wherein the virtual object corresponds to an avatar.

29. The non-transitory computer-readable medium of claim 21, wherein the hardware capabilities of the display device include one or more sensors of the display device.

* * * * *